(12) United States Patent
McClelland et al.

(10) Patent No.: US 7,109,626 B2
(45) Date of Patent: Sep. 19, 2006

(54) COMPACT DYNAMOELECTRIC MACHINE

(75) Inventors: Michael L. McClelland, Leeds (GB); Gary E. Horst, Manchester, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/774,216

(22) Filed: Feb. 6, 2004

(65) Prior Publication Data

US 2005/0174007 A1  Aug. 11, 2005

(51) Int. Cl.
*H02K 1/00* (2006.01)

(52) U.S. Cl. .......................................... 310/216; 310/89

(58) Field of Classification Search ................ 310/216, 310/89, 261, 52, 54, 67 R, 91
See application file for complete search history.

(56) References Cited

U.S. PATENT DOCUMENTS

| | | | | |
|---|---|---|---|---|
| 3,984,711 A | * | 10/1976 | Kordik | 310/49 R |
| 4,316,113 A | * | 2/1982 | Sato et al. | 310/262 |
| 4,626,719 A | * | 12/1986 | Foster | 310/49 R |
| 4,933,581 A | | 6/1990 | Shramo | |
| 5,489,810 A | | 2/1996 | Ferreira et al. | |
| 5,545,938 A | | 8/1996 | Mecrow | |
| 5,770,910 A | | 6/1998 | Horst | |
| 5,945,759 A | * | 8/1999 | Tanaka et al. | 310/90 |
| 6,222,289 B1 | * | 4/2001 | Adames | 310/54 |
| 6,225,715 B1 | * | 5/2001 | Hoda et al. | 310/67 R |
| 6,538,799 B1 | * | 3/2003 | McClelland et al. | 359/291 |
| 6,707,219 B1 | * | 3/2004 | Matsushita et al. | 310/233 |
| 6,762,521 B1 | * | 7/2004 | Peter et al. | 310/89 |

FOREIGN PATENT DOCUMENTS

| | | |
|---|---|---|
| CH | 663 300 A5 | 11/1987 |
| EP | 0 480 484 A2 | 4/1992 |
| EP | 0 948 116 A2 | 10/1999 |
| GB | 2 139 011 A | 10/1984 |
| WO | WO 02/091547 A1 | 11/2002 |

* cited by examiner

*Primary Examiner*—Darren Schuberg
*Assistant Examiner*—Nguyen N. Hanh
(74) *Attorney, Agent, or Firm*—Harness, Dickey & Pierce P.L.C.

(57) ABSTRACT

A compact dynamoelectric machine having a rotor with a length which is less than the length of a corresponding stator core. The rotor is rotatable on a shaft supported by bearings, with at least one of the bearings being positioned longitudinally within the stator core. Two endshields define opposite ends of the machine. One of the endshields is configured for holding electronic components in arrangement integrated with the machine.

26 Claims, 7 Drawing Sheets

COMPACT DYNAMOELECTRIC MACHINE

BACKGROUND OF THE INVENTION

This invention relates generally to dynamoelectric machines, and in particular to an integrated starter generator having a rotor of decreased length to meet space constraints while maintaining efficient performance.

Dynamoelectric machines such as electric motors convert energy between electrical current and mechanical motion. As known to those skilled in the art, a machine typically includes a rotatable assembly, or rotor, mounted within a hollow core of a stationary assembly, or stator, which holds windings of insulated wire. The windings are energized with electrical current, causing the stator to magnetically interact with the rotor. The rotor and stator have cross-sectional shapes and sizes configured to minimize radial spacing between rotor and stator (known as the air gap), while avoiding any direct physical contact which could interfere with free rotation of the rotor.

Frequently, a machine must fit within a relatively small space, such as for installation inside an appliance, and yet maintain output or operational efficiency more closely commensurate with larger machines. Unfortunately, size constraints can reduce the generation of magnetic flux and torque. Typically, the stator core and rotor are each formed of a large number of flat, thin laminations of ferromagnetic material (e.g., steel) which are stacked to a desired length and secured together. The strength of the magnetic field and resulting output of the machine depend in part upon the size of the stator, and particularly its length. For a fixed level of electrical current in the windings, the torque output of a motor having a relatively longer stator is greater than the torque output of a motor having a relatively shorter stator.

Conventionally, the rotor and stator core have lengths which are equal. During manufacture, corresponding laminations for use in forming the rotor and stator core are die punched simultaneously in pairs from flat, thin-gauge sheets of material. Typically, all of these pairs of laminations are used to stack the stator core and rotor to equal lengths because they each contribute to an improvement in the air gap permeance (i.e., the ability to conduct magnetic flux between the stator core and rotor). As known to those skilled in the art, permeance increases proportionally with the length of overlap between the stator core and rotor (i.e., the length of the air gap). A motor having a rotor and a stator core of differing lengths will generally conduct flux primarily along the overlap. Another reason previous machines have equal length rotor and stator core is that it is generally considered a waste of ferromagnetic material to discard laminations in forming the shorter component, as the laminations are available in corresponding pairs.

The need to package some machines and associated electronic components within an extremely compact space demands that the machine have a length which is small. For example, an integrated starter generator for an automotive vehicle must be packaged so that it occupies only a relatively small volume in a vehicle engine compartment (e.g., maximum length and diameter dimensions of about six inches). These size constraints are superimposed on the need for highly efficient operation, and can produce conflicting design guidelines. Although a reduction in stator core length would better meet space constraints, that would reduce torque output or, alternatively, require an increase in electrical current to maintain equivalent magnetic flux and torque. The latter degrades efficiency because additional electrical current brings an increase in iron and copper losses and related heat generation. Further, the ferromagnetic materials cannot support infinite magnetic flux densities. They tend to "saturate" at a certain level (dictated by the dimensions and geometry of the part) such that further increases in magnetic field force do not result in proportional increases in magnetic field flux. When the stator becomes magnetically saturated, an increase in electrical current fails to produce a substantial increase in torque output.

Further aggravating the design requirements is the need to provide sufficient space for heat transfer in cooling the machine. The machine generates heat during operation which may degrade efficiency or damage component parts, such as the windings or bearings. One cooling approach which has been adopted is to install a cooling jacket around the outer circumference of the stator core. The jacket receives a coolant which is circulated through passages in or around the jacket to remove heat generated in stator windings and core during operation. Cooling is particularly challenging for a relatively small or compact machine, which has less area for conduction of heat from the stator core to the cooling jacket. A reduction in stator core length degrades heat transfer capacity and can result in inadequate heat dissipation.

SUMMARY OF THE INVENTION

Among the several objects and features of the present invention may be noted the provision of a dynamoelectric machine which is compact in size; the provision of such a machine which operates efficiently; the provision of such a machine having a cooling system for removing heat from the machine; the provision of such a machine having integrated electronic components; and the provision of such a machine which is economical.

In general, a dynamoelectric machine according to the present invention comprises a stator core having a longitudinal axis and a length along the axis. Wire windings are on the stator core, and a rotor is mounted for rotation relative to the stator core about the axis to interact magnetically with the stator core and windings. The rotor has a length along the axis. The length of the rotor is less than the length of the stator core.

In another aspect, a dynamoelectric machine of the invention comprises a stator core having a longitudinal axis and a length along the axis, wire windings on the stator core, and a rotor mounted for rotation relative to the stator core about the axis to interact magnetically with the stator core and windings. Two endshields define opposite ends of the machine. At least one of the endshields has a portion which extends to a longitudinal position within the stator core.

Other objects and features of the present invention will be in part apparent and in part pointed out hereinafter.

BRIEF DESCRIPTION OF THE DRAWINGS

Corresponding reference characters indicate corresponding parts throughout the views of the drawings.

DETAILED DESCRIPTION OF THE PREFERRED EMBODIMENT

Referring now to the drawings and in particular to FIGS. 1-4, a dynamoelectric machine according to the present invention is designated in its entirety by the reference numeral 10. The machine 10 is particularly suited for use in applications where space constraints require the length of the machine to be smaller than would be desired for its expected output. In one embodiment, the machine is intended for installation into an engine compartment of an automotive vehicle for use as an integrated starter and generator. Although the description herein is primarily with reference to that embodiment, it is understood that other dynamoelectric machines, such as electric motors or generators of other sizes and for other fields of industry, do not depart from the scope of this invention.

A front endshield 12 (FIGS. 1–4) and a back endshield 14 define opposite longitudinal ends of the machine 10. The endshields 12, 14 are connected by three circumferentially spaced bolt fasteners 16 which are received through corresponding bores on each endshield. Mounting lugs 18 on the endshields are provided for receiving fasteners (not shown) to secure the machine in a vehicle engine compartment. A grooved pulley 20 is positioned at a front end of the machine and is secured on a shaft 22 by a threaded nut 24. When the machine 10 functions as a motor, the pulley 20 transmits power from the shaft 22 to a drive belt (not shown). When the machine 10 functions as a generator, the pulley 20 transmits power from the drive belt to the shaft 22.

Figure 1:
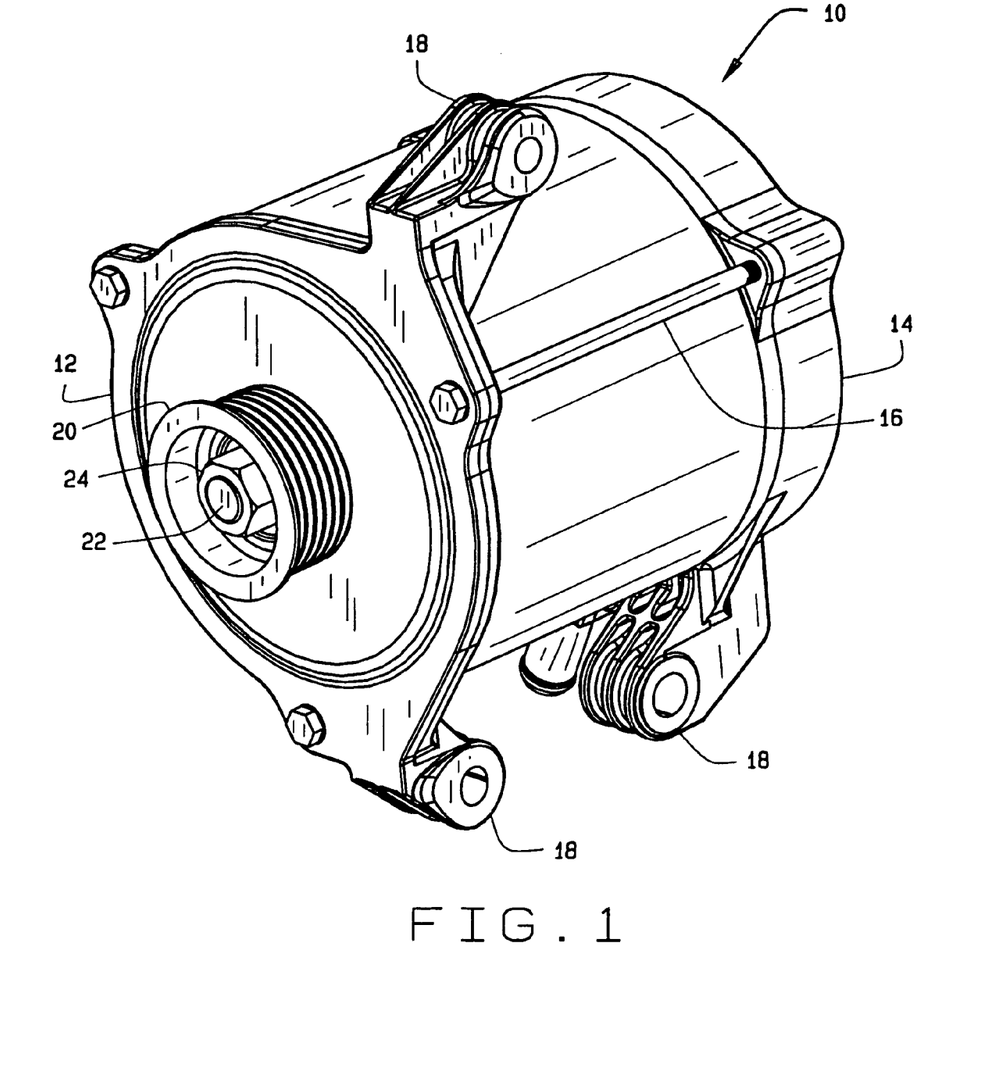
FIG. 1 is a perspective of a dynamoelectric machine according to the present invention.
Figure 2:
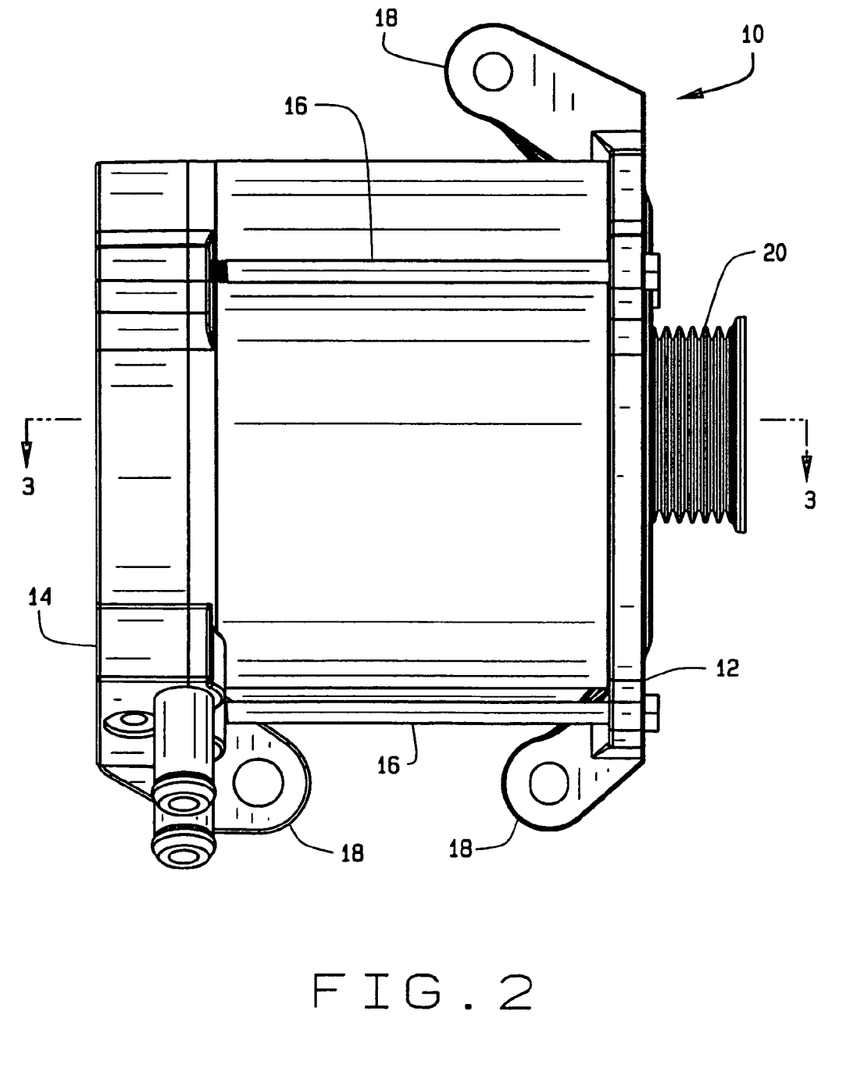
FIG. 2 is an elevation of the machine of FIG. 1.
Figure 3:
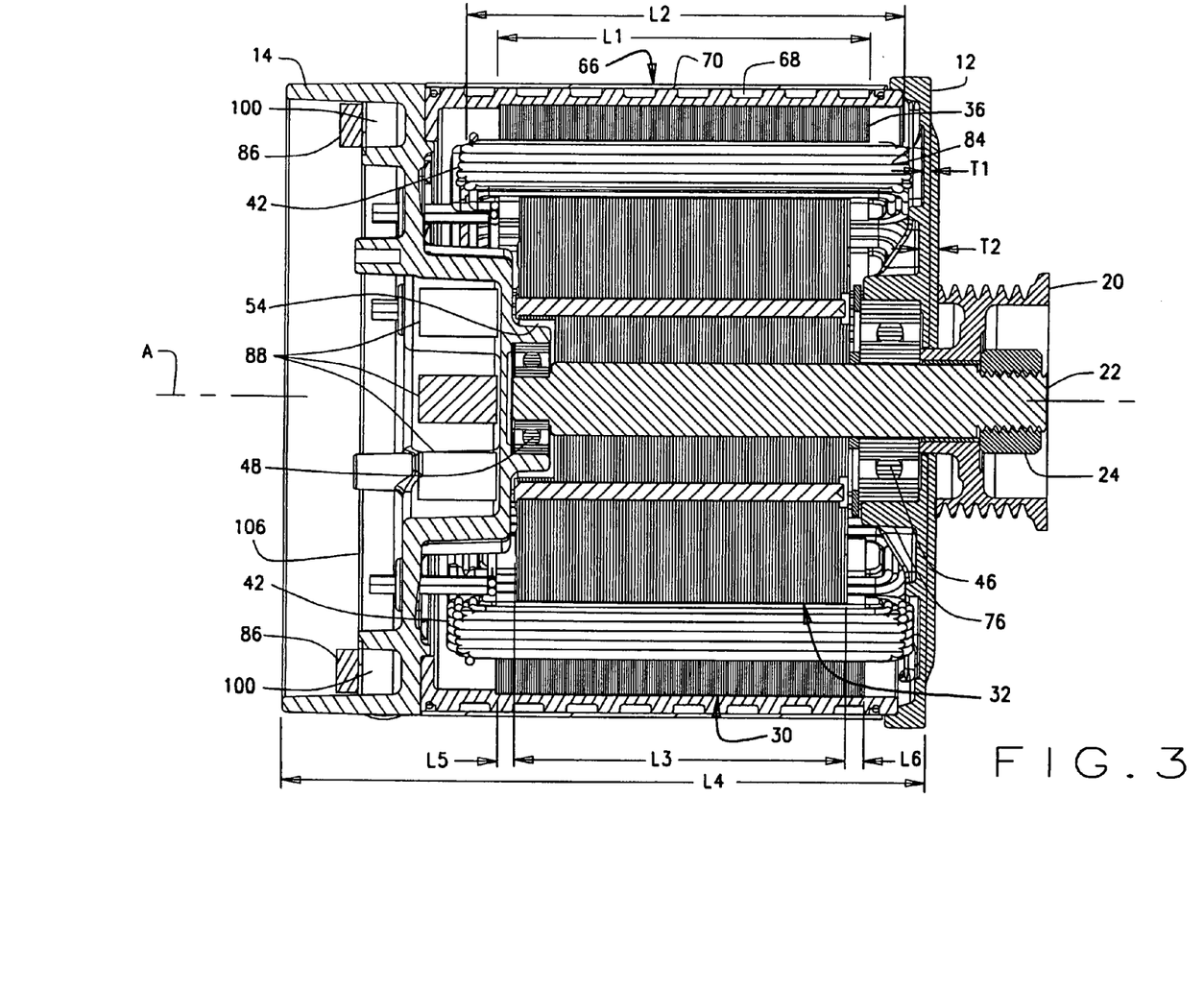
FIG. 3 is a schematic section on line 3—3 of FIG. 2.
Figure 4:
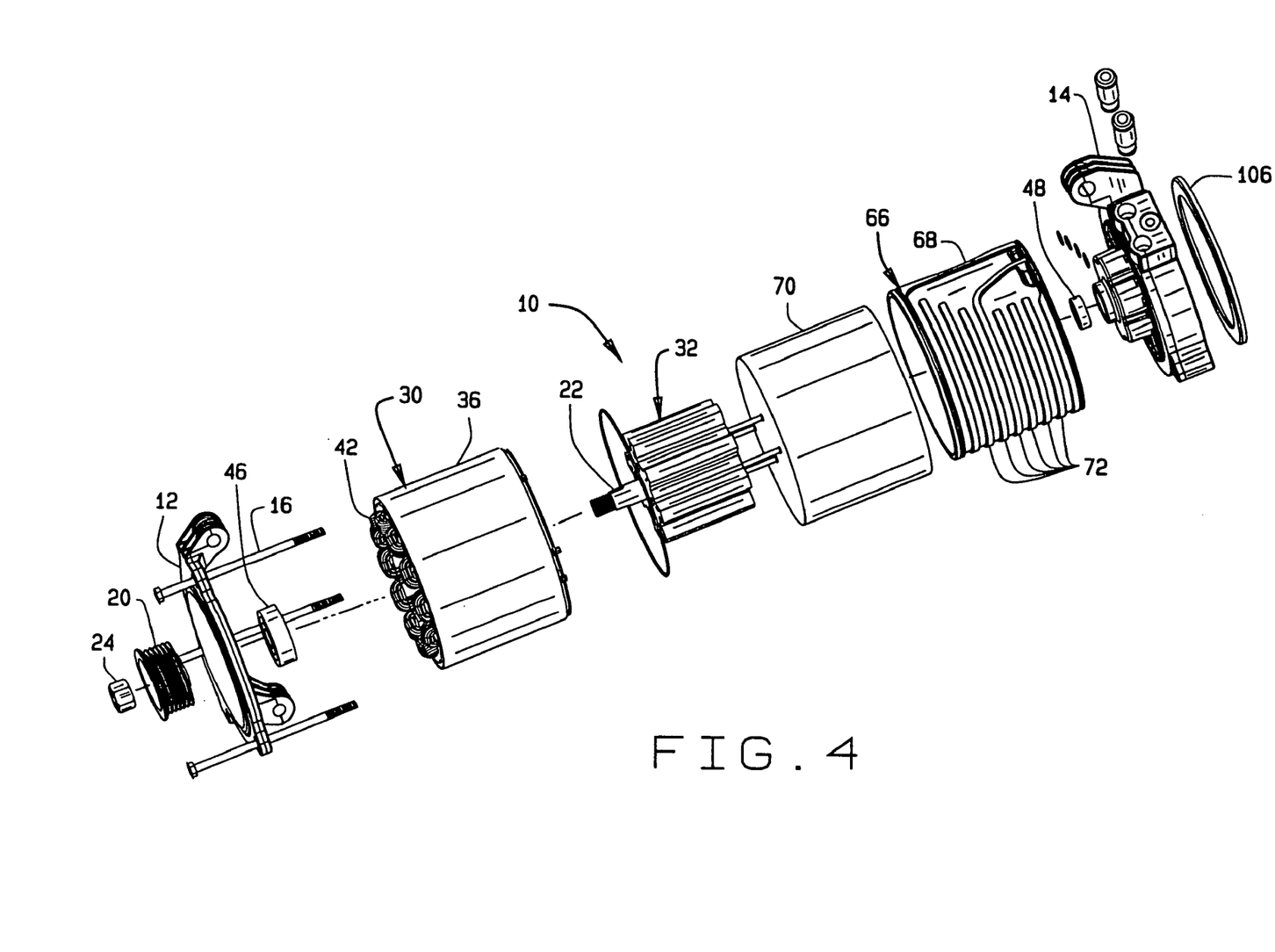
FIG. 4 is an exploded perspective of the machine showing component parts of the machine.

Referring to FIGS. 3 and 4, the machine 10 includes a stationary assembly or stator (generally designated 30) and a rotatable assembly or rotor (generally designated 32) magnetically coupled to the stator. In one embodiment, the machine 10 is a switched reluctance type machine where both stator 30 and rotor 32 have salient poles. As known to those skilled in the art, a switched reluctance motor has a rotor shape which concentrates magnetic flux lines into poles on the rotor which then interact with the field of the stator. It is understood that the machine can be of other types, including a permanent magnet type machine, without departing from the scope of this invention.

As is known in the art, the stator 30 includes a stator core 36 formed of many thin, flat, and generally annular-shaped laminations 38 (FIG. 5) of ferromagnetic material (e.g., steel) each of which is coated with insulation to reduce eddy currents and associated iron losses in the core. The laminations are stacked together to form a hollow cylinder defining the core 36. The stator core 36 has a generally cylindric outer surface and an inner surface with a number of circumferentially spaced teeth 40 defining slots between adjacent teeth. The slots hold one or more wound coils of insulated wire, or windings 42, on the core 36. The windings 42 may be encapsulated in a potting material (not shown) to improve transfer of heat from the windings. The machine transforms electrical energy into mechanical torque, or vice versa, when the windings 42 are energized with electrical current, causing the stator 30 to act as an electromagnet and interact with the rotor 32. The stator core 36 has a length L1 (FIG. 3) with end turns of the windings 42 extending beyond the core to define a stator envelope length L2.

The rotor 32 is received in the stator core 36 and is rotatable with the shaft 22 which extends along a central longitudinal axis A. The shaft 22 is mounted in the machine 10 on a front bearing 46 and a back bearing 48. The rotor 32 and stator 30 are coaxially aligned, generally along the axis A, with an annular air gap 50 (FIG. 5) therebetween. There is no direct physical or electrical connection between the rotor and the stator. As is known in the art, the rotor 32 comprises many flat and thin laminations 52 of ferromagnetic material (e.g., steel) each of which is coated with insulation to reduce eddy currents and associated iron losses in the rotor. The laminations 52 are stacked and secured together to form the rotor 32 having a length L3. A central recess 54 (FIG. 3) is formed at one end of the rotor 32 for receiving the back bearing 48 supporting the shaft 22. The recess 54 is formed by an enlarged hole in corresponding laminations 52.

Figure 5:
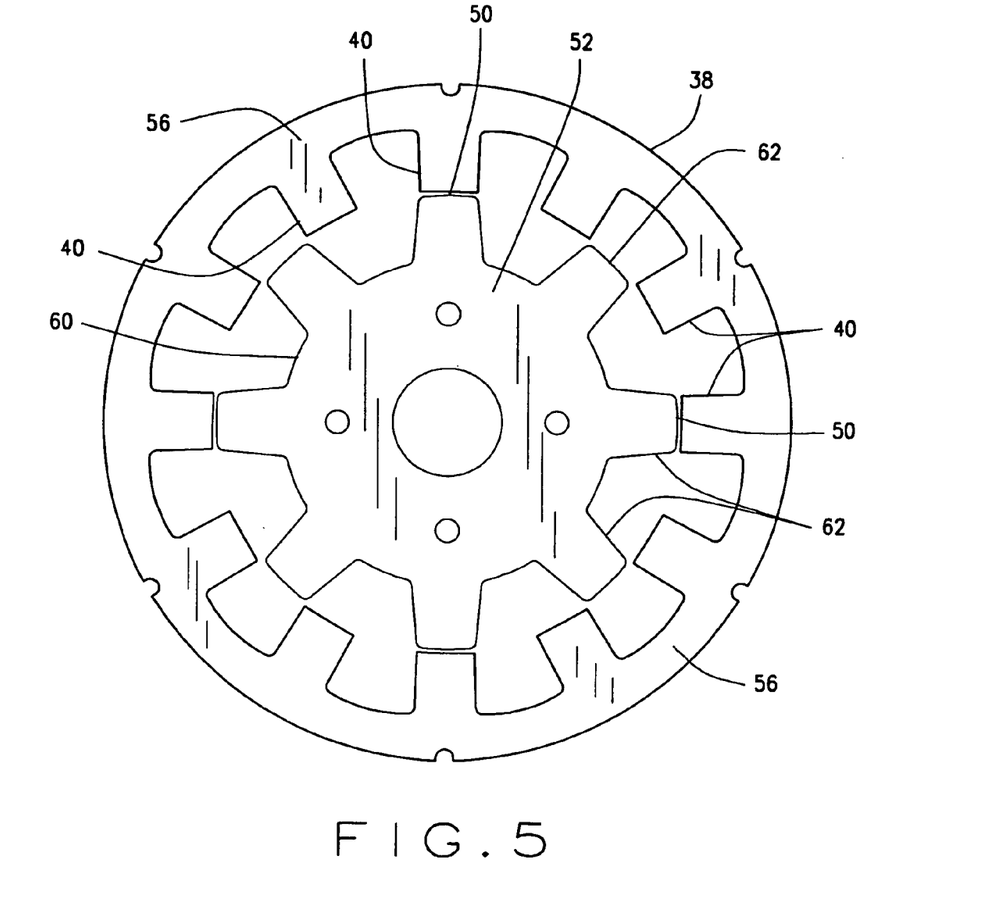
FIG. 5 is a schematic elevation of a pair of corresponding rotor and stator laminations.

A lamination 38 of the stator and a corresponding lamination 52 of the rotor are shown in FIG. 5. Each stator lamination 38 has a generally annular shape with an outer peripheral portion 56, known to those skilled in the art as "back iron," which connects the teeth 40. The teeth 40 are directed radially inward from the peripheral portion 56 for holding the windings 42 in slots formed between pairs of adjacent teeth. Conventional interlock formations (not shown) are on each lamination. Each rotor lamination 52 has a generally circular hub 60 (comprising the rotor back iron), a number of circumferentially spaced teeth 62 directed radially outward from the hub, and a central hole 64 for receiving the shaft 22. The minimum radial spacing between stator teeth 40 and rotor teeth 62, defining the air gap 50, is small (e.g., 0.015 inch). In operation, the stator back iron 56 tends to become magnetically saturated before the rotor back iron 60 (i.e., with a lower amount of electrical current in the windings 42). The density of magnetic flux in the stator back iron 56 is greater than a corresponding density in the rotor back iron 60 because of the geometrical configuration. The stator core 36 is hollow, and as shown in FIG. 5, the outer peripheral portion 56 has substantially less width than the hub 60 of the rotor. As a result, the back iron of the stator core has less ferromagnetic material for supporting flux than does the back iron of the rotor. Because of its relative bulk, the rotor 32 may more readily be reduced in size without producing substantial changes in magnetic flux density and resulting iron losses and heat generation in the rotor. Thus, the operational efficiency of the machine is less sensitive to deviation in axial length of the rotor as compared to the stator. It is understood that other configurations, such as a rotor having less relative width and which reaches magnetic saturation before the stator, does not depart from the scope of this invention.

Significantly, the length L3 of the rotor 32 is less than the length L1 of the stator core 36, as shown in FIG. 3. That permits an overall length L4 of the machine 10 to be minimized because the bearings 46, 48 and endshields 12, 14 can be positioned more closely together. The lengths differ by the sum of two increments L5 and L6 on opposite ends of the rotor. That length difference is not merely due to mechanical tolerances, i.e., the rotor 32 is shorter than the stator by at least one lamination thickness, and preferably at least three lamination thicknesses. In one embodiment, the increments L5 and L6 are approximately equal such that the rotor is positioned generally at the longitudinal center of the stator. It is understood that the increments may vary without departing from the scope of this invention. Further, the rotor may extend longitudinally outside of the stator.

The back bearing 48 is received in the recess 54 of the rotor and located within a length envelope of the stator core 36, that is, inside a longitudinal segment of the machine corresponding with L1. That feature permits the back endshield 14 to extend into the machine for compact arrangement of the machine and its associated electrical components, as described more fully hereinafter. Although the bearing 48 is positioned in its entirety within the stator core length envelope (as well as being within the rotor length envelope L3), it could be only partially so positioned. Magnetic flux is conducted between the rotor 32 and stator core 36 primarily at the overlapping length portions. Therefore, portions of the stator core length envelope (at L5 and L6) extending beyond the rotor do not, in general, contribute to the air gap permeance. However, those portions do carry flux within the stator core 36 and thereby contribute to minimization of flux density and iron losses in the stator core. Further, they provide additional length for thermal cooling, as discussed hereinafter.

In one embodiment and for example only, the machine 10 has the following approximate dimensions:

L1=3.4 inch (86 mm) L4=6.0 inch (152 mm)
L2=4.1 inch (103 mm) L5=0.2 inch (4.5 mm)
L3=3.0 inch (77 mm) L6=0.2 inch (4.5 mm)

A cooling jacket assembly, indicated generally at 66 in FIGS. 3 and 4, is provided for receiving a liquid coolant (not shown) to remove heat energy from the machine. The jacket includes an annular inner shell 68 and complementary annular outer shell 70 configured for nesting coaxial alignment to define an annular gap between the inner and outer shells. A plurality of fins 72 are formed on an outer surface of the inner shell 68 and project radially outward through the annular gap to engage the outer shell 70. The fins 72 define flow paths for conveying the coolant through the cooling jacket 66. The outer shell 70 comprises a cylindric tube which is placed around the inner shell 68. The inner shell 68 has a cylindric inner surface defining a cavity for receiving the stator 30 so that the stator core 36 is in heat transfer contact with the cooling jacket. Preferably, an entire length L1 of the stator core 36 is in heat transfer communication with the cooling jacket, including those portions (corresponding to L5 and L6) which extend longitudinally beyond the rotor 32. In one embodiment, the inner shell 68 is sized for an interference fit with the stator 30, having an inner diameter which is only slightly less than a diameter of the outer surface of the stator core 36. Further details of the cooling jacket and endshields are disclosed in co-assigned U.S. Pat. application Ser. No. 10/774,228, filed Feb. 6, 2004, and entitled "Cooling System For Dynamoelectric Machine," which is hereby incorporated by reference.

Figure 8:
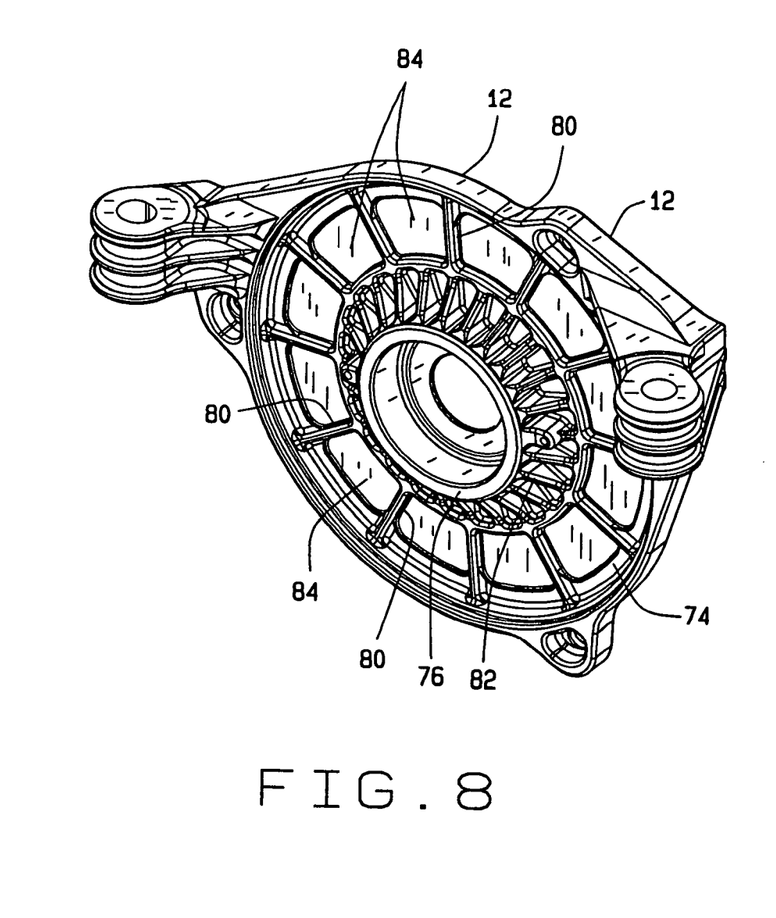
FIG. 8 is a first perspective of a front endshield of the machine.
Figure 9:
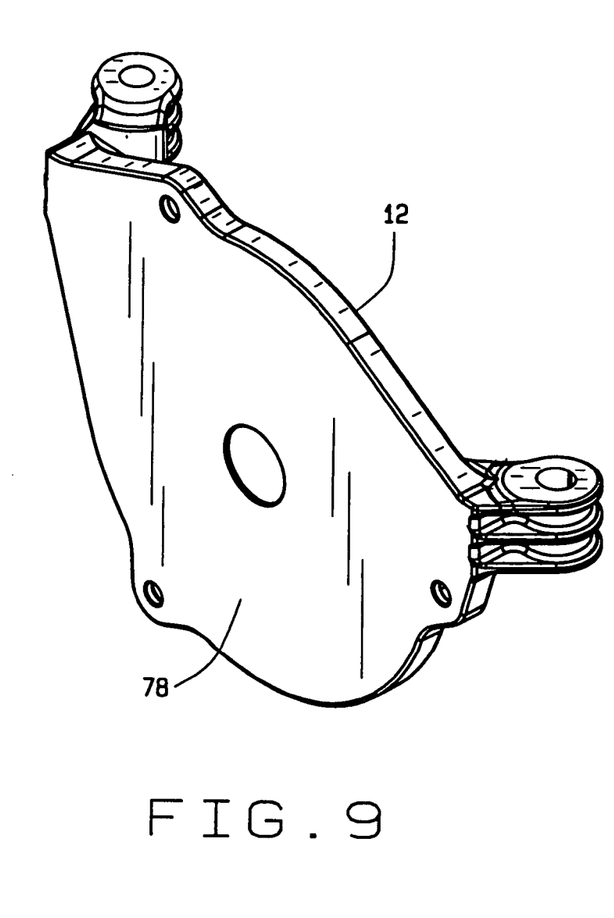
FIG. 9 is a second perspective of the front endshield of FIG. 8.

The front endshield 12, shown in FIGS. 8 and 9, has an inner side 74, for facing toward the machine, formed with a circular hub 76 for receiving the front bearing 46 to support the rotor shaft 22. The hub 76 and front bearing 46 are longitudinally positioned partially within the stator length envelope L2, as shown in FIG. 3, generally adjacent the end turns of windings 42. It is understood that the front bearing can have other positions without departing from the scope of this invention. An outer side 78 of the endshield, for facing away from the machine, is generally flat. The hub 76 is supported by a plurality of radial ribs 80 and gussets 82.

Between each pair of adjacent ribs is a flat region, referred to by those skilled in the art as a "window" 84. When installed in the machine, the front endshield 12 is positioned relative to the stator 30 such that each of the windows 84 is in registering alignment with one of the end turns of the windings 42. Length constraints and the need for a compact machine favor positioning the front endshield 12 as close as feasible to the stator 30, without engaging and compressing the windings. Consequently, the windows 84 are formed with a thickness T1 (FIG. 3) which is less than a thickness T2 typical of other regions of the front endshield 12. As the window regions do not carry significant structural loads, there is no substantial detriment to making them relatively thinner, and it provides another benefit in making the machine more lightweight. However, the machine 10 should be fully enclosed to prevent entry of moisture or contaminants, so that the window regions 84 should not be pierced. It is understood that other configurations of the endshield do not depart from the scope of this invention.

Figure 6:
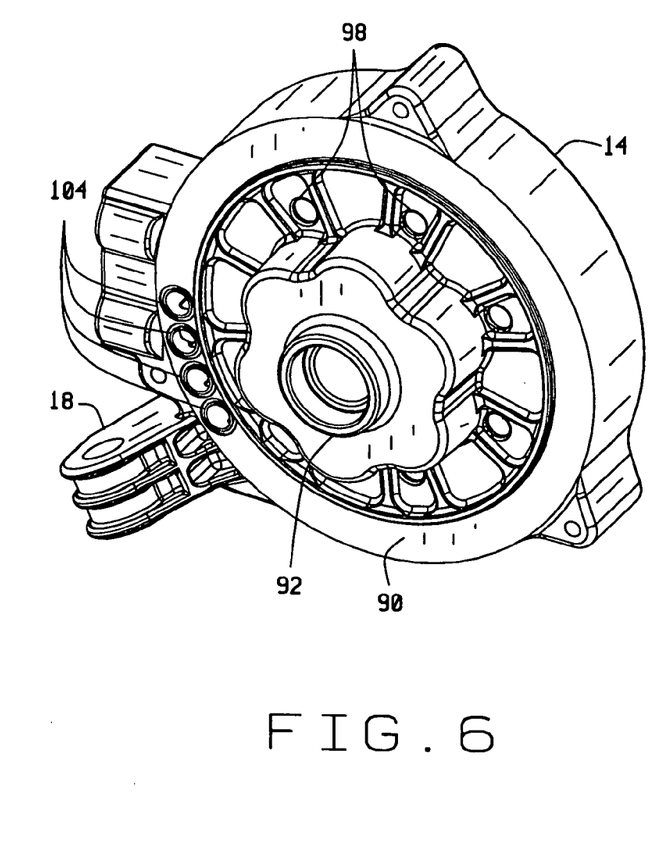
FIG. 6 is a first perspective of a back endshield of the machine.
Figure 7:
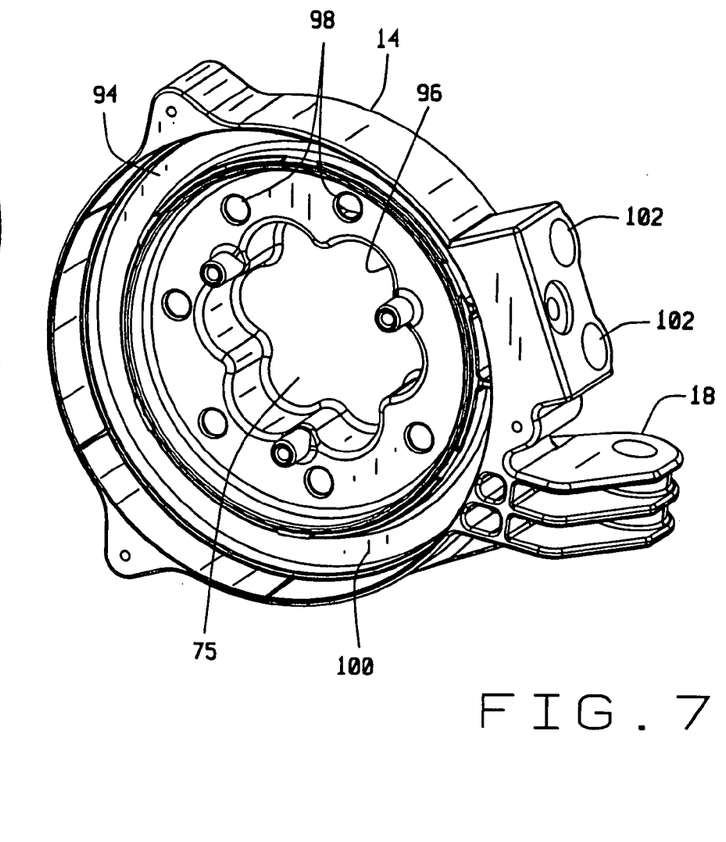
FIG. 7 is a second perspective of the back endshield of FIG. 6.

Referring to FIGS. 6 and 7, the back endshield 14 comprises a housing adapted for mounting and cooling electronic components which are associated with the machine, such as controls 86 or capacitors 88 (shown schematically in FIG. 3). The endshield 14 has an inner side 90, for facing toward the machine, which extends to a longitudinal position within the stator core length envelope L1. A circular hub 92 receives the back bearing 48 to support the rotor shaft 22. The hub and bearing are received in the central recess 54 of the rotor 32. An outer side 94 of the endshield, for facing away from the machine, has a cavity 95 with six crescent-shaped edges 96 for receiving a plurality of capacitors 88 which store energy for driving accessories or for starting the machine 10. Significantly, the capacitors 88 are integrated with the machine in a compact arrangement. The capacitors are located inside the stator length envelope, that is, inside a longitudinal segment of the machine corresponding with L2. Holes 98 in the back endshield 14 are for routing electrical connections (not shown) to the windings 42.

An annular channel 100 (FIGS. 3 and 7) in the outer side of the back endshield 14 forms a passage for flow of coolant around the endshield. Inlet and outlet ports 102 are provided for receiving and discharging coolant. Four passageways 104 (FIG. 6) extend through the inner side 90 of the back endshield 14 and are in fluid communication with the channel 100. When installed, the back endshield 14 engages the inner shell 68 of the cooling jacket 66 as shown in FIG. 3, and the flow passage 100 is in fluid communication with the cooling jacket. Coolant flows in the channel 100 around the back endshield 14 and then flows through the cooling jacket 66. A flat, annular body 106 (FIGS. 3 and 4) is received on the outer side 94 of the back endshield 14 to enclose the channel 100. The body 106 is in heat transfer communication with coolant as it flows through the channel 100. The body 106 defines a surface for mounting electronic components 86 by suitable attachment, and it is formed of a rigid and thermally conductive material (e.g., aluminum) so that heat energy from the electronics is transferred through the body to the coolant.

Thus, the back endshield 14 facilitates a compact machine 10 with capacitors and other electronic components integrated with the machine, avoiding the need to mount them remote from the machine which would require additional space. Further, it provides for integrated cooling of the electronic components by coolant which travels around the endshield and then through the cooling jacket. Other endshield designs do not depart from the scope of this invention.

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

The invention claimed is:

1. A dynamoelectric machine comprising:
   a stator core having a longitudinal axis and a length along said axis;
   wire windings on said stator core;
   a rotor shaft;
   a rotor positioned within the stator core and mounted for rotation relative to the stator core about said axis to interact magnetically with the stator core and windings, the rotor having a length along said axis;
   at least one capacitor for storing energy for driving accessories or for starting the dynamoelectric machine;
   at least a first bearing supporting the rotor shaft for rotation, said first bearing being positioned longitudinally within the stator core; and
   at least one endshield having a cavity for holding the capacitor;
   wherein said length of the rotor is less than said length of the stator.

2. A dynamoelectric machine as set forth in claim 1 wherein the machine comprises a plurality of capacitors for storing energy for driving accessories or for starting the dynamoelectric machine.

3. A dynamoelectric machine as set forth in claim 2 wherein said length of the rotor is less than said length of the stator.

4. A dynamoelectric machine as set forth in claim 2 wherein the rotor is longitudinally centered in the stator core.

5. A dynamoelectric machine as set forth in claim 2 further comprising a second bearing supporting the rotor shaft for rotation.

6. A dynamoelectric machine as set forth in claim 2 wherein the rotor includes a recess for receiving said first bearing.

7. A dynamoelectric machine as set forth in claim 2 further comprising two endshields defining opposite ends of the machine, at least one of the endshields having a portion which extends to a longitudinal position within the stator core.

8. A dynamoelectric machine as set forth in claim 7 wherein at least one said endshield comprises a housing for mounting electronic components of the machine.

9. A dynamoelectric machine as set forth in claim 2 further comprising a cooling jacket for removing heat from the machine, the cooling jacket being in heat transfer communication with the stator core along the entire said length of the stator core.

10. A dynamoelectric machine as set forth in claim 2 wherein said machine is a switched reluctance type machine.

11. A dynamoelectric machine as set forth in claim 2 wherein the cavity defines a plurality of crescent-shaped edges for receiving the plurality of capacitors.

12. A dynamoelectric machine as set forth in claim 2 wherein the cavity defines six crescent-shaped edges for receiving the plurality of capacitors.

13. An integrated starter generator for an automobile having the dynamoelectric machine of claim 1.

14. The integrated starter generator of claim 13 wherein the dynamoelectric machine is a switch reluctance motor.

15. The integrated starter generator of claim 14 further comprising a cooling jacket for removing heat from the generator, the cooling jacket being in heat transfer communication with the stator core along the entire said length of the stator core.

16. A dynamoelectric machine comprising:
   a stator core having a longitudinal axis and a length along said axis;
   wire windings on said stator core;
   a rotor mounted for rotation relative to the stator core about said axis to interact magnetically with the stator core and windings;
   at least one capacitor for storing energy for driving accessories or for starting the dynamoelectric machine; and
   two endshields defining opposite ends of the machine, at least one of the endshields having a portion which extends to a longitudinal position within the stator core and at least one of the endshields having a cavity for holding the capacitor.

17. A dynamoelectric machine as set forth in claim 16 wherein the machine comprises a plurality of capacitors for storing energy for driving accessories or for starting the dynamoelectric machine.

18. A dynamoelectric machine as set forth in claim 17 further comprising a rotor shaft and two bearings supporting the rotor shaft for rotation, and wherein the rotor and at least one of the bearings is positioned longitudinally within the stator core.

19. A dynamoelectric machine as set forth in claim 18 wherein the rotor includes a recess for receiving said bearing.

20. A dynamoelectric machine as set forth in claim 17 further comprising a cooling jacket for removing heat from the machine, the cooling jacket being in heat transfer communication with the stator core along the entire said length of the stator core.

21. A dynamoelectric machine as set forth in claim 17 wherein said machine is a switched reluctance type machine.

22. A dynamoelectric machine as set forth in claim 17 wherein the cavity defines a plurality of crescent-shaped edges for receiving the plurality of capacitors.

23. A dynamoelectric machine as set forth in claim 17 wherein the cavity defines six crescent-shaped edges for receiving the plurality of capacitors.

24. An integrated starter generator for an automobile having the dynamoelectric machine of claim 16.

25. The integrated starter generator of claim 24 wherein the dynamoelectric machine is a switch reluctance motor.

26. The integrated starter generator of claim 25 further comprising a cooling jacket for removing heat from the generator, the cooling jacket being in heat transfer communication with the stator core along the entire said length of the stator core.

* * * * *